G. M. CAMERON-COWBURN.
GEARING.
APPLICATION FILED DEC. 7, 1921.

1,425,172.

Patented Aug. 8, 1922.

Inventor:-
G. M. Cameron-Cowburn
by
Hubert E. Rich, atty.

UNITED STATES PATENT OFFICE.

GERTRUDE MABEL CAMERON-COWBURN, OF GOSPORT, ENGLAND.

GEARING.

1,425,172. Specification of Letters Patent. Patented Aug. 8, 1922.

Application filed December 7, 1921. Serial No. 520,532.

*To all whom it may concern:*

Be it known that I, GERTRUDE MABEL CAMERON-COWBURN, a subject of the King of Great Britain and Ireland, and resident of Gosport, Hants, England, have invented new and useful Improvements in Gearing, of which the following is a specification.

This invention of improvements in gearing has for its object to provide gearing in which the drive is transmitted from the driving member to the driven member frictionally, the power being thus transmitted more smoothly and with greater efficiency than is the case when toothed gearing is employed.

Gearing, in accordance with this invention, comprises a primary member, a secondary member and an intermediate member constituted of rollers and a plate or disc, the rollers having smooth faces and being of cylindrical or conical shape and rolling on smooth and correspondingly shaped paths formed on the primary and secondary members.

Figure 1:
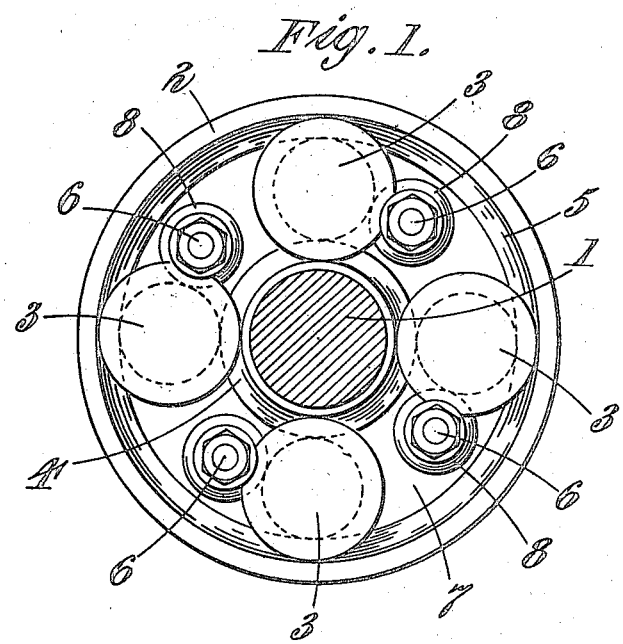
Figure 2:
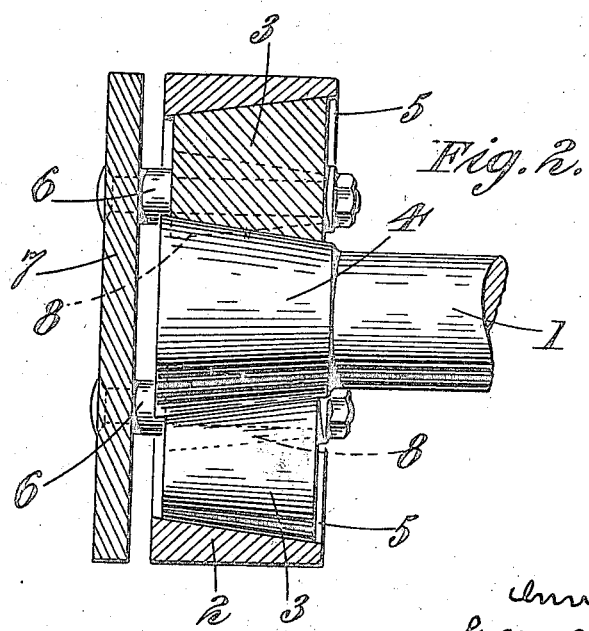

In order that the invention, the nature of which has been set forth, may be clearly and readily understood, reference will now be made to the accompanying drawings, on which Fig. 1 is an end view, and Fig. 2 is a sectional elevational view of gearing in accordance with this invention.

In the construction illustrated, the primary member 1 comprises a shaft and the secondary member 2 a ring. The intermediate member comprises rollers 3 and a plate or disc 7. The rollers 3 are of conical shape and contact with portions 4, 5 of the shaft 1 and ring 2, respectively, which are shaped to correspond. The portions 4, 5 constitute paths for the rollers 3 and their surfaces are smooth and hardened, as are the surfaces of the rollers 3. The plate or disc 7 is connected with the part to be driven. The plate or disc 7 carries pins 6 on which are mounted revoluble rollers 8. The shaft 1 is connected with a prime mover and, when driven, power is transmitted through the rollers 3, the pins 6 and rollers 8 to the part or parts to be driven. Conversely the plate 7 may be driven and power taken off from the ring 2 or shaft 1, or both.

What I claim is:—

Friction gearing comprising a primary member, a secondary member encircling the primary member, intermediate members constituted of rollers interposed between the primary and secondary members, all of said members having coned coacting faces, a plate disposed in relation to said members, a plurality of pins mounted and projecting laterally from said plate and rollers mounted on said pins and having coned faces to coact with the coned faces of the intermediate members.

Dated this 14th day of November, 1921.

GERTRUDE MABEL CAMERON-COWBURN.